June 5, 1951 | G. L. CARSON | 2,556,027

RELAXATION OSCILLATOR

Filed Feb. 6, 1948

INVENTOR.
GEORGE LESLIE CARSON
BY
Brown, Denk & Synnestvedt
AGENTS

Patented June 5, 1951 2,556,027

UNITED STATES PATENT OFFICE 2,556,027

RELAXATION OSCILLATOR

George Leslie Carson, Philadelphia, Pa., assignor to Philco Corporation, Philadelphia, Pa., a corporation of Pennsylvania Application February 6, 1948, Serial No. 6,691

2 Claims. (Cl. 250—36)

The invention herein described and claimed relates to an improvement in the frequency stabilization of a relaxation oscillator. More particularly, the present invention provides a relaxation oscillator whose operating frequency is substantially independent of variations in D.-C. plate voltage. Such variations may be due to an unregulated plate voltage supply or may be caused by adjustments made intentionally to the D.-C. voltage applied to the plate of the oscillator tube to control, for example, the amplitude of the output voltage.

The present invention is adapted to wide application and, in general, may be employed to advantage wherever it is desired to stabilize the frequency of a relaxation oscillator. While the invention is applicable to other forms of relaxation oscillator, the invention may be employed to important advantage in blocking tube oscillators whose frequency is intended to be a function of an RC or L/R time constant. The invention may be advantageously employed, for example, in the deflection circuits of a television receiver to maintain the frequency of the sweep oscillators substantially constant irrespective of variations in the D.-C. voltage applied to the plate of the sweep oscillator tube.

It is an object of this invention to provide a relaxation oscillator whose frequency is substantially independent of variations occurring in the D.-C. plate voltage.

It is a more specific object of this invention to provide improved means for stabilizing, against variations in D.-C. plate voltage, the operating frequency of a blocking or other relaxation oscillator whose operating frequency is intended to be controlled by the RC or L/R time constant of a network connected in the grid or plate circuits of the oscillator.

Figure 1:
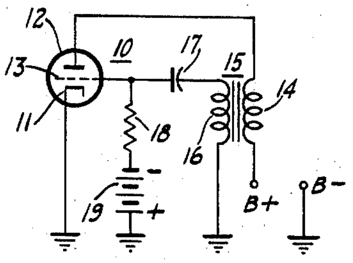
Figure 2:
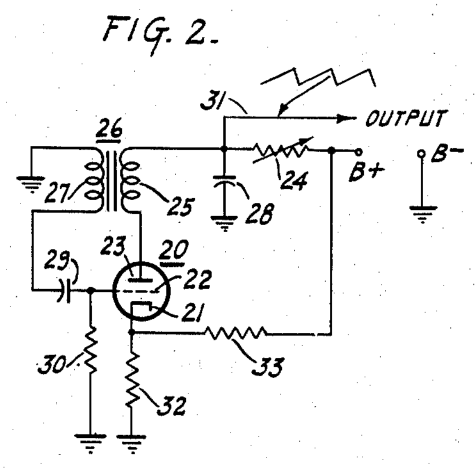
Figure 3:
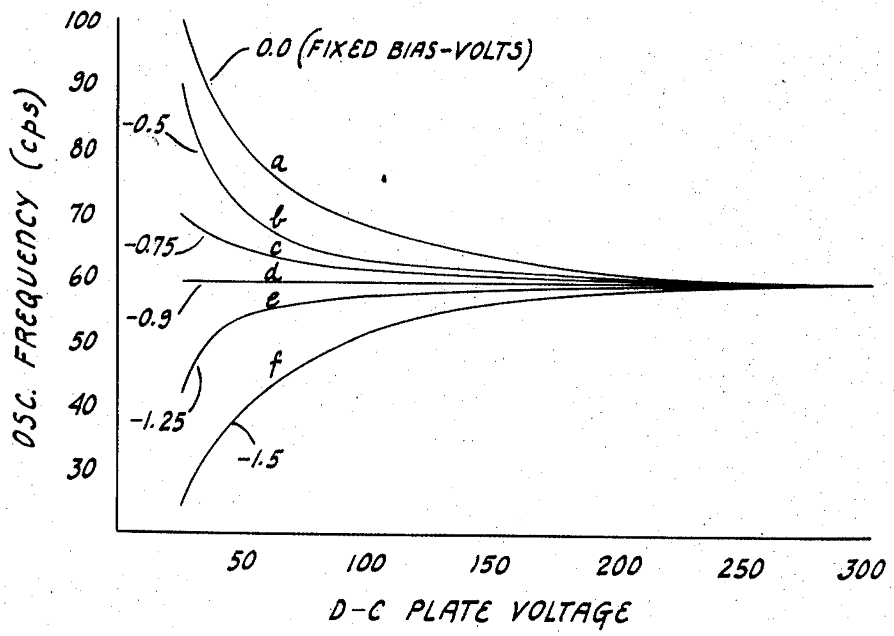

These and other objects, features and advantages of the present invention, and the manner in which the objects are attained, will become clear from a consideration of the following detailed description and accompanying drawing wherein Figure 1 is a schematic illustration of a blocking tube oscillator incorporating the improvement of the present invention, Figure 2 is a schematic illustration of an embodiment of the invention in a combined blocking-tube-oscillator and sawtooth-generator circut, and Figure 3 shows a family of curves which illustrates the nature of the improvement derived from the present invention.

Referring now to Figure 1 there is shown a blocking tube oscillator which, except for the modification introduced by the present invention, is entirely conventional. The oscillator shown comprises a triode 10 having a cathode 11, plate 12 and grid 13. Cathode 11 may be connected directly to ground. Plate 12 is connected to a source of plate voltage, B+, by way of the primary winding 14 of transformer 15. The secondary winding 16 of transformer 15 is connected to grid 13 by way of grid capacitor 17. A discharge path for capacitor 17 is provided by grid leak 18 shown to be connected in shunt with grid capacitor 17 and secondary winding 16. If desired, grid leak 18 may, of course, be connected across grid capacitor 17 alone. The circuit, thus far described, is entirely conventional.

I have discovered that a very large improvement in the frequency stability of a relaxation oscillator may be achieved by employing a fixed bias in addition to the bias provided conventionally by the grid leak. The magnitude and polarity of the fixed bias, required to achieve the greatest improvement, is dependent upon the particular type of oscillator tube employed and upon the particular circuit constants involved, as will be discussed further. In the circuit of Figure 1, a fixed negative bias is shown to be provided by battery 19 and applied to grid 13 by way of grid leak 18. The improved circuit shown in Figure 1 differs, then, from a conventional circuit in that the direct-current path from grid 13 to ground includes a source of negative voltage of fixed magnitude.

Referring now to Figure 3, curve *a* is representative of the manner in which the frequency of a conventional blocking oscillator varies with changes in D.-C. plate voltage when the oscillator tube is operated at zero fixed bias, as is conventional. The particular curve *a* shown in Figure 3 happens to represent specifically the characteristic of a 6SL7 oscillator tube connected in the circuit of Figure 1 with grid capacitor 17 having a value of 0.1 microfarad and grid leak 18 having the value required to produce an operating frequency of 60.0 cycles per second at a D.-C. plate potential of three hundred volts. But curve *a* may also be considered as representative of the general shape of the frequency versus plate voltage characteristic of a conventional blocking oscillator employing other types of oscillator tubes and other values of grid capacitance, where the oscillator tube is operated at zero fixed bias, as is customary.

In a common form of conventional blocking tube oscillator, the operating frequency is a function of the time constant of an RC circuit connected, ordinarily at least, in the grid-to-cathode circuit of the oscillator. In such an oscillator, the period of conduction is relatively short and the period of non-conduction is relatively long. In another form of conventional blocking tube oscillator, sometimes referred to as a sawtooth-current generator, the operating frequency is primarily a function of the L/R time constant of a portion of the oscillator circuit including the transformer and grid leak. In such an oscillator, the period of conduction is substantially longer than the cut-off period. The circuit diagrams of both forms of blocking tube oscillators are similar, the difference in operation being effected by a difference in circuit constants. In both of these prior art blocking tube oscillators, the operating frequency changes as the D.-C. plate voltage is varied.

I have discovered that a relaxation oscillator employing a given type of tube may be frequency stabilized at a desired operating frequency over an extremely wide range of D.-C. plate voltage values by applying to the oscillator tube a particular value of fixed bias. Moreover, I have discovered that the same particular value of fixed bias will provide good frequency stability, for that particular type of oscillator tube and circuit, at any desired operating frequency over a rather wide range of frequencies.

Referring again to Figure 3, I have plotted a series of oscillator frequency versus D.-C. plate voltage curves for different values of fixed negative bias applied to the grid of the oscillator tube. The particular curves shown are those of a 6SL7 blocking tube oscillator connected in the circuit of Figure 1 using a grid capacitance of 0.1 microfarad and a grid leak of the value required to produce an oscillator frequency of 60.0 cycles per second at a D.-C. plate potential of three hundred volts. Observe that, as the fixed negative bias applied to the grid of the tube is increased from zero to an optimum value of −0.9 volt, the frequency stability of the oscillator steadily improves. Note further, however, that as the fixed negative bias is increased beyond the optimum value of −0.9 volt, the frequency stability of the oscillator is decreased.

I have ascertained that the optimum value of fixed bias required to achieve frequency stability is relatively independent of the oscillator operating frequency determined by the RC or L/R time constants of the pertinent portion of the oscillator circuit. The optimum value is also relatively independent of the particular transformer ratio employed. I have observed, however, that the optimum fixed bias is related to the cut-off characteristic of the particular tube, as will be indicated below.

In my experiments, using a 6SL7 tube in a circuit similar to that shown in Figure 1, I noted that with a fixed bias of −0.9 volts I was able to maintain substantially constant frequency while varying the plate supply voltage, B+, from above three hundred volts down to about fifteen volts, at which point the circuit went out of oscillation. Throughout this wide range of plate supply voltages, the oscillator frequency remained practically constant at 60.0 cycles per second, the maximum deviation therefrom being 0.1 cycle per second. Similar results were obtained with a 6SN7 oscillator tube when a fixed bias of −2.4 volts was employed. A6C4 tube required a fixed bias of −3.8 volts to attain comparable frequency stability. I have observed that the fixed bias required to achieve good frequency stability is of the order of one-half the cut-off of the particular tube with one hundred volts applied to the plate. The required bias may also be said to be of the order of that used for operation of the particular tube as a class A amplifier at the expected average plate voltage.

When a fixed bias of −0.9 volts was applied to a 6SL7 oscillator tube in the vertical-deflection system of a television receiver, the oscillator frequency remained constant at 60.0 cycles per second, without varying as much as 0.1 cycle per second, while the D.-C. plate voltage was varied from 175 volts to 375 volts. When the RC circuit was adjusted to produce an oscillation frequency of 120 cycles per second at a D.-C. plate potential of three hundred volts, while maintaining a fixed bias of −0.9 volts, the maximum frequency deviation which occurred, when the D.-C. plate potential was varied from 375 volts down to 175 volts, was 0.6 cycle per second, a maximum deviation of one-half of one per cent. Under similarly varying plate voltage conditions, the frequency of the conventional zero-fixed-bias oscillator varied by as much as twenty per cent.

In the circuit of Figure 1, I have shown a fixed biasing voltage of required magnitude and polarity to be provided by a battery 19. It is to be understood, however, that other well known biasing arrangements may be used. In some instances, the improvement provided by the present invention may take the form shown in Figure 2.

Referring now to Figure 2, there is shown schematically a combination blocking-tube-oscillator and sawtooth-generator circuit which is suitable for use in the vertical-deflection system of a television receiver. The circuit shown comprises a triode 20 having a cathode 21, grid 22 and plate 23. Plate 23 is supplied from a source of positive direct-current voltage, B+, by way of a variable resistor 24 and the primary winding 25 of the oscillator transformer 26. Capacitor 28 is the capacitor across which the sawtooth voltage is developed. The secondary winding 27 of oscillator transformer 26 is connected, by way of the oscillator grid capacitor 29, to grid 22. Resistor 30 is the usual grid leak. In the prior art circuit, cathode 21 is connected directly to ground, but in the improved circuit of the present invention cathode 21 is connected to ground by way of resistor 32 and is connected to the plate voltage supply, B+, by way of resistor 33. Resistors 32 and 33 thus function as a voltage divider across the source of supply voltage, B+; and the voltage at the junction of the resistors 32, 33 is applied to the cathode 21 as a grid-cathode bias. In general, the bias provided by the divider 32—33 should be essentially the same as the bias provided by the battery 19 of Figure 1.

In the prior art circuit corresponding to Figure 2, and also in the improved circuit of the present invention, during the time that oscillator tube 20 is cut-off, capacitor 28 charges toward the positive supply voltage, B+, at a rate determined by the value of resistor 24. When the oscillator tube 20 conducts, capacitor 28 discharges rapidly through the tube. A sawtooth voltage is thus developed across capacitor 28 which may be taken off by means of output lead 31. By varying resistor 24, the amplitude of the sawtooth output voltage is varied. Resistor 24 is therefore employed, in some prior art television circuits, to control the height of the picture reproduced on the cathode-ray-tube screen of the television receiver.

In well-designed television receivers, the plate supply voltage, B+, tends to be relatively constant, and in some instances is regulated against variations in line voltage and the like.

In the prior art circuit corresponding to Figure 2, the frequency of the blocking tube oscillator, and hence the frequency of the sawtooth output voltage, changes whenever resistor 24 is adjusted. For, adjusting resistor 24 changes the effective D.-C. potential on plate 23, and the prior art oscillator is frequency sensitive to such changes. The improved circuit shown in Figure 2, is, however, frequency stable irrespective of changes in the effective D.-C. plate potential. For, cathode 21 of tube 20 is supplied, through the medium of the relatively stable plate voltage supply and the voltage-dividing action of resistors 32—33, with a substantially fixed positive bias of optimum value so that the frequency of oscillation remains substantially constant over a wide range of D.-C. plate voltage values, such as is indicated in Figure 3 by curve *d*. It will be understood that while the potential on cathode 21, during periods of conduction, is a function of plate current, the cathode potential, during periods of cut-off, is fixed by the supply voltage, B+, and voltage-divider 32—33. It is the fixed potential on cathode 21, i. e. the tube bias, during the cut-off period which is important in determining the operating frequency of the oscillator. The method used in the circuit of Figure 2 to bias cathode 21 positively by a fixed amount, equivalent of course to biasing grid 22 negatively by that amount, is somewhat more practical than that used in Figure 1, and will be found to be quite satisfactory, provided, of course, the plate supply voltage, B+, is relatively stable, as will ordinarily be the case.

The particular value of fixed bias required to accomplish frequency stabilization over a wide range of D.-C. plate voltages depends upon the particular type of oscillator tube and circuit involved, and may be readily ascertained experimentally. I have determined that, for the type of blocking tube oscillator whose frequency is intended to be controlled by the time constant of an RC circuit connected in the grid-to-cathode circuit of the oscillator, the optimum fixed bias is of the order of magnitude previously indicated and is negative in polarity. This category includes most oscillators whose periods of conduction are short in comparison with the periods of non-conduction. For the type of blocking tube oscillator whose frequency is controlled by the L/R time constant of the transformer and grid leak portions of the oscillator circuit, the optimum fixed bias will be of the same general order of magnitude but positive in polarity. This category includes the so-called sawtooth-current deflection oscillator sometimes employed in the horizontal-deflection circuits of a television receiver. This type of oscillator is characterized by periods of conduction which are substantially longer than the periods of non-conduction.

I have not presented a theoretical discussion of the reasons why such a marked improvement in frequency stability is obtained when a fixed bias of proper magnitude and polarity is applied to the oscillator tube. Several possible explanations suggest themselves, but I am not at all certain of the true explanation, and feel that no useful purpose would be served in advancing, at this time, a theory which may prove to be in error.

In view of the lack of theoretical explanation, I have been careful to make an adequate number of careful experiments so as to assure the nature of the phenomenon which I have discovered.

Having described my invention, I claim:

1. In a blocking tube oscillator comprising a vacuum tube having cathode, plate and grid electrodes, a source of positive direct-current plate voltage connected to said plate, transformer means for regeneratively coupling the grid-cathode and plate-cathode circuits of said tube, and a grid-leak grid-capacitor combination connected in the grid-cathode circuit of said tube for controlling the operating frequency of said oscillator, the improvement which comprises the provision of means for stabilizing the operating frequency of said oscillator against changes in direct-current plate potential, said stabilizing means comprising: a source of direct-current voltage of relatively small fixed magnitude connected in the grid-cathode circuit of said tube to effect the application of a fixed bias to said tube, the magnitude of said fixed bias being equal to that value of fixed bias which, connected in the grid-cathode circuit of said tube when the direct-current plate voltage is relatively low, will effect operation of said oscillator at a frequency substantially equal to that at which said oscillator operates when the direct-current plate voltage is so high that variations in the magnitude of said fixed bias have substantially no effect upon the operating frequency of said oscillator.

2. In a blocking tube oscillator comprising a vacuum tube having cathode, plate and grid electrodes, a source of positive direct-current plate voltage connected to said plate, transformer means for regeneratively coupling the grid-cathode and plate-cathode circuits of said tube, and a grid-leak grid-capacitor combination connected in the grid-cathode circuit of said tube intended to establish the operating frequency of said oscillator, the improvement which comprises the provision of means for stabilizing the operating frequency of said oscillator against changes in direct-current plate potential, said stabilizing means comprising: a source of direct-current voltage of relatively small fixed magnitude connected in the grid-cathode circuit of said tube to effect the application of a fixed bias to said tube, the magnitude of said fixed bias being equal to that value of fixed bias which, connected in the grid-cathode circuit of said tube when the direct-current plate voltage is low, will effect operation of said oscillator at a frequency substantially equal to that at which said oscillator operates when the magnitude of said fixed bias is zero and the direct-current plate voltage is high.

GEORGE LESLIE CARSON.

REFERENCES CITED

The following references are of record in the file of this patent:

UNITED STATES PATENTS

| Number | Name | Date |
|---|---|---|
| 2,083,246 | Smiley | June 8, 1937 |
| 2,165,770 | Tolson | July 11, 1939 |
| 2,292,835 | Hepp | Aug. 11, 1942 |
| 2,358,297 | Bedford | Sept. 19, 1944 |
| 2,411,062 | Schade | Nov. 12, 1946 |
| 2,440,895 | Cawein | May 4, 1948 |
| 2,447,082 | Miller | Aug. 17, 1948 |